United States Patent [19]
Huang

[11] Patent Number: 5,845,917
[45] Date of Patent: Dec. 8, 1998

[54] TELESCOPIC HANDLE FOR A STROLLER

[76] Inventor: Li-chu Chen Huang, No. 99, Fuchou 7th St., Chiayi City, Taiwan

[21] Appl. No.: 744,541

[22] Filed: Nov. 6, 1996

[51] Int. Cl.$^6$ ........................................................ B62B 3/00
[52] U.S. Cl. .................................. 280/47.371; 280/655.1; 16/115; 403/109; 74/551.3
[58] Field of Search ............................ 280/47.17, 47.315, 280/47.371, 655, 655.1; 16/115; 190/104, 115, 117; 188/67; 403/108, 109; 74/491, 493, 551.1, 551.3

[56] References Cited

U.S. PATENT DOCUMENTS

| | | | |
|---|---|---|---|
| 4,587,864 | 5/1986 | Kassai | 74/551.3 |
| 4,924,725 | 5/1990 | Takahashi et al. | 280/47.371 X |
| 5,184,835 | 2/1993 | Huang | 280/47.371 |
| 5,625,923 | 5/1997 | Huang | 16/115 |

*Primary Examiner*—Robert J. Oberleitner
*Assistant Examiner*—Pamela J. Lipka
*Attorney, Agent, or Firm*—Merchant, Gould, Smith, Edell, Welter & Schmidt, P.A.

[57] ABSTRACT

A telescopic handle for a stroller comprises a handle, a pair of middle tubes securely fixed with the handle, a pair of outer tubes each securely fixed with a respective one of the middle tubes and the handle and having a through hole and a pair of inner tubes each movably received within the middle tubes and having a slot and a plurality of holes opposed to the outer tube holes. A controlling device is received within the through hole of each outer tube for determining which of the holes of the inner tube are selected and accordingly lengthen the handle or shorten the handle.

2 Claims, 6 Drawing Sheets

TELESCOPIC HANDLE FOR A STROLLER

FIELD OF THE INVENTION

The present invention generally relates to a stroller, and more particularly to a stroller whose handle is able to further extend to fit all people of different height.

BACKGROUND OF THE INVENTION

Strollers having a braking system for parking safely, wheels for turning, and foldable means for storing the same have been widely used all over the world. By means of the above mentioned improved device, a user can provide a comfortable environment to a baby and convenience for herself/himself while walking outdoors.

Most of the devices are designed to provide a better environment for babies while resting in the stroller, however, the ergonomic convenience of a user is not always considered, thus when the user is using the stroller, he/she will find some trouble operating it.

Among those few designs on a stroller which has been particular designed for the convenience of a person pushing it, a handle which is able to swing back and forth to provide a change in direction is quite a considerable design. Yet, for those who are not tall enough to reach the handle, such a design still can not fulfill the needs.

From the previous description, it is noted that especially for those people who are under average height or above average height, a general stroller will not meet their requirement. Therefore, a stroller having a known telescopic handle is thus introduced to the public to meet requirements of users having variety of height.

A prior telescopic handle used in a stroller is shown in FIG. 6 and FIG. 7.

It is noted from FIG. 6 that a prior telescopic handle used in a stroller includes an upper tube 60 and a lower tube 70. The upper tube 60 is configured to have a through hole 61 having a first end 611 and a second end 612, wherein the first end 611 of the through hole 61 is provided within a recess 613 defined in a periphery of the upper tube 60. Within the recess 613 and the through hole 61, a controlling means 80 is slidably received. The lower tube 70 is configured to have a first slot 71 defined in a periphery thereof and a second slot 72 defined opposite to the first slot 71. The second slot 72 is further configured to have a plurality of spaced holes 721 each coincide with the second slot 72. The controlling means includes a housing 81 configured to mate with a dimension of the recess 613, a presser 82 slidably received within the housing 81 and provided with an extension 820 integrally formed on a face thereof, a coil spring 83 urged between a face of the recess 613 and a bottom face of the extension 820 and a rod 84 slidably receiver within the through hole 61 and having three different dimensions. A groove 821 having an entrance 822 is defined in the extension 820 of the presser 82, such that a first dimension 841 of the rod 84 configured to be snugly inserted through the first end 611 of the through hole 61 is able to be received within the groove 821 from the entrance 822 of the presser 82, before a coil spring 83 is inserted between the recess 613 and a bottom face of the extension 820 (as seen from FIG. 7A). Still referring to FIG. 6 and taking FIG. 7A for reference, the presser 82 is securely received within a space of the housing 81, and a top face of the presser 82 flushes with a peripheral end (not numbered) of the housing (81).

FIG. 7A shows that after the upper tube 60 and the lower tube 70 are assembled by inserting the lower tube 70 into the upper tube 60, the rod 84 is inserted into one of the plurality of holes 721 and the first slot 71 of the lower tube 70, then the second end 612 of the through hole 61 and the first dimension 841 extends out the first end 611 of the through hole 61. Before the first dimension 841 of the rod 84 is inserted into the groove 821 from the entrance 822 of the extension 820, a coil spring 83 is inserted between a face of the recess 613 and the bottom face of the presser 82. When the insertion of the first dimension 841 of the rod 84 into the groove 821 of the extension 820 is accomplished, due to the resilience force of the coil spring 83, the rod 84 is slidably received within the through hole 61. Still referring to FIG. 7A, it is to be noted that the second dimension 842 is configured to urge against the first end 611 of the through hole 61 and a fourth dimension 844 of the rod 84 is configured to be received within one of the plurality of holes 721, resulting that the lower tube 70 is thus maintained unmovably. When a user presses inward the presser 82, the fourth dimension 844 of the rod 84 will be free from the constraints of one of the plurality of holes 721, and therefore the lower tube 70 is movably within a length of the second slot 72 or the first slot 71 (as seen from FIG. 7B). When a length adjustment between the upper tube 60 and the lower tube 70 is accomplished, the fourth dimension 844 is again received within one of the plurality of holes 721, and the lower tube 70 is also retained thereby.

A design of this type of telescopic handle used in a stroller suffers from the friction between the plurality of holes 721 and the rod 84. Because the friction between the rod 84 and the plurality of holes 721 after a prolong usage causes loose connection therebetween and which results in that the handle of the stroller is not connected securely enough. Therefore, a type of this design will not able to meet the requirements of modern society.

Thus, a stroller having a novel telescopic handle constructed in accordance with the present invention tends to mitigate and/or obviate the aforementioned problems.

SUMMARY OF THE INVENTION

The main objective of the invention is to provide a telescopic handle for a stroller. The telescopic handle is able to extend to be comfortably reachable by all kinds of people having different heights, such that no matter how tall or how short a user may be, he/she will always be able to operate the stroller with ease.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
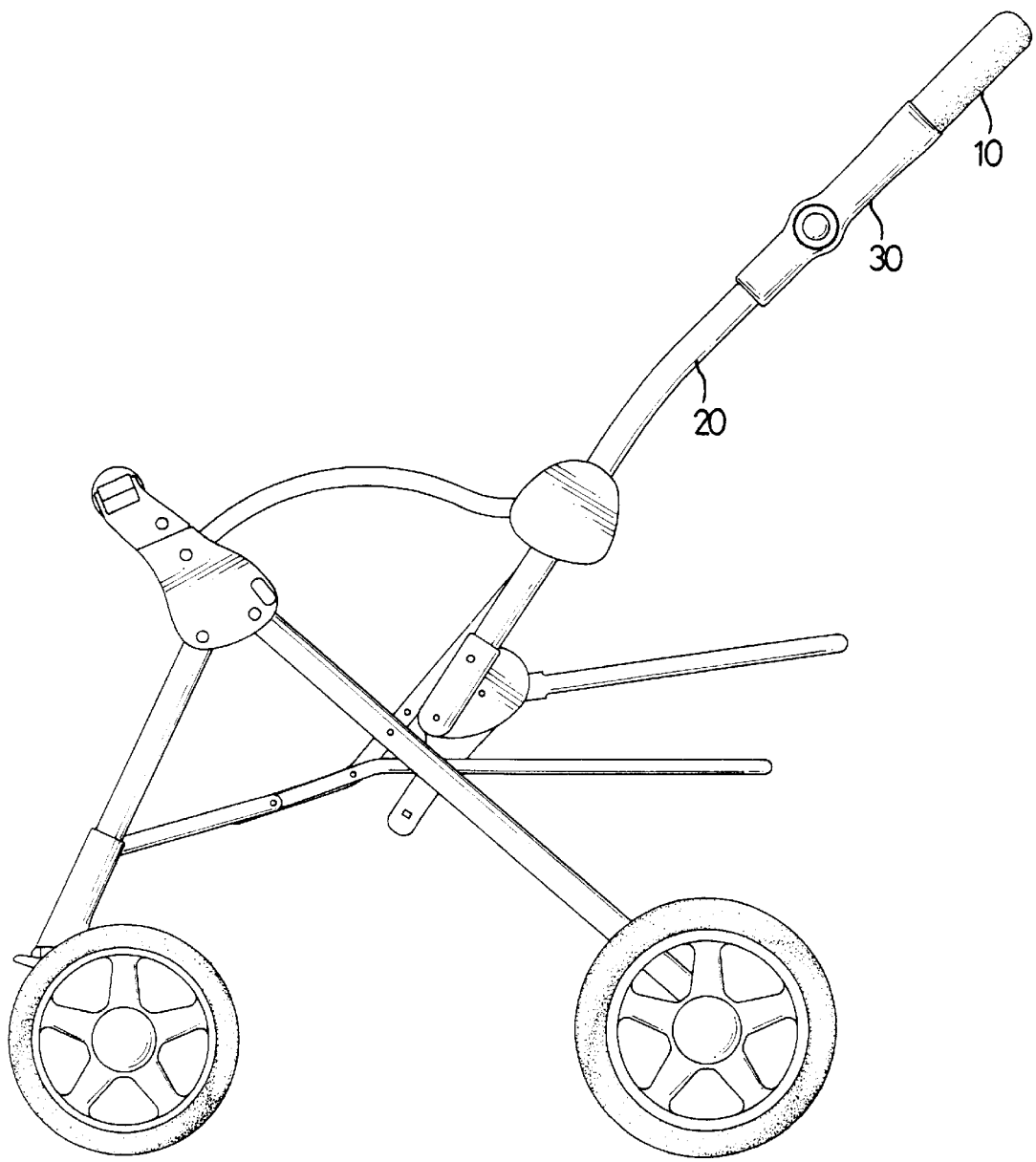
FIG. 1 is a perspective view of the invention.
Figure 2:
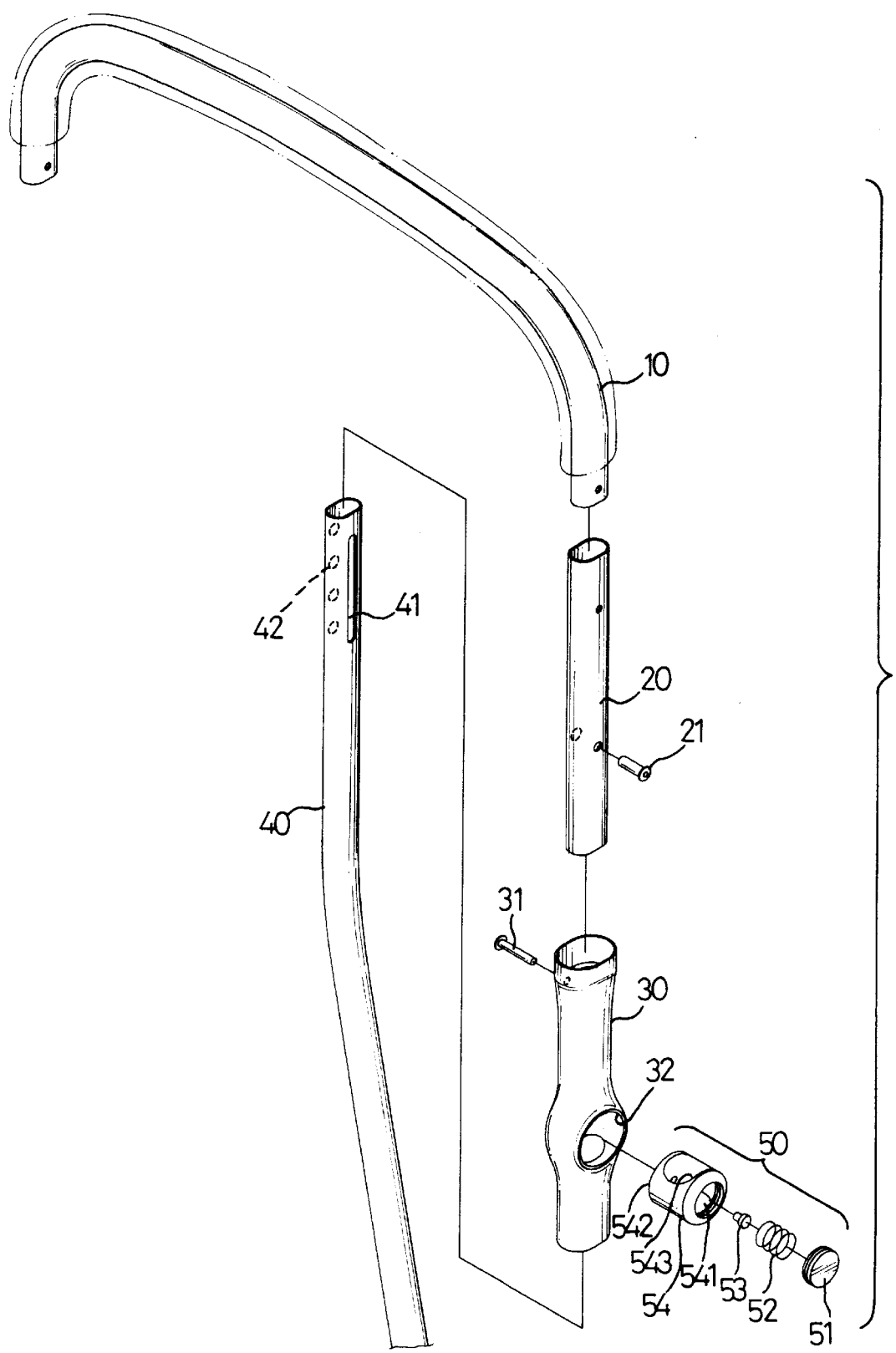
FIG. 2 is an exploded view of the present invention.
Figure 3:
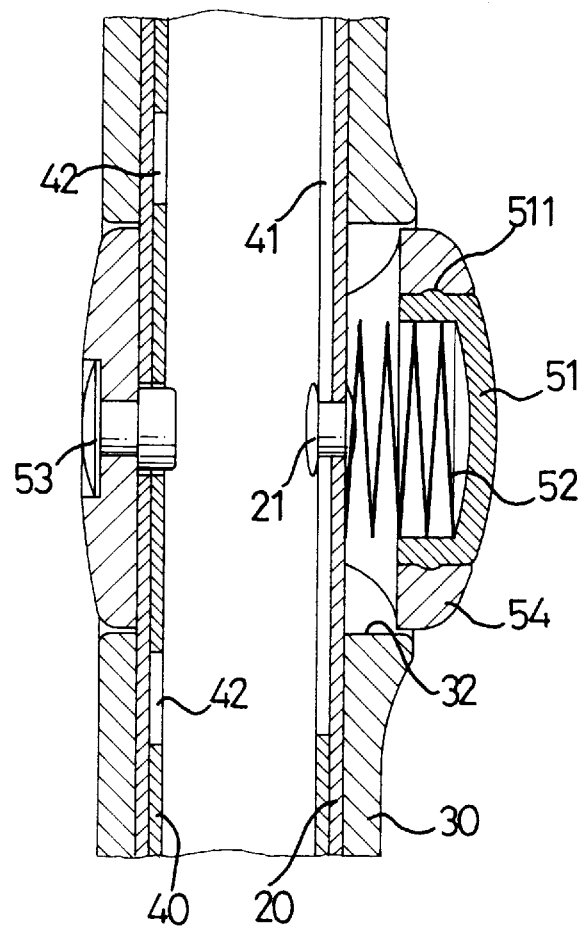
FIG. 3 an enlargement schematic view of a controlling means constructed in accordance with the present invention.

Referring to FIGS. 1 and 2, one preferred embodiment of the invention is shown. A telescopic handle for a stroller constructed in accordance with the present invention comprises a "U" shaped handle 10, a pair of middle tubes 20 rigidly fixed within the handle 10, a pair of outer tubes 30 each securely connected with the handle 10 and enclosing each of the middle tube 20 therein by means of a first pin 31 and a pair of inner tubes 40 each movably received within a respective one of the middle tubes 20 by means of a second pin 21 movably received within a slot 41 thereof. The inner tube 40 is configured to have a plurality holes 42 provided in one side face thereof and corresponding to the slot 41. The outer tube 30 further comprises a controlling means 50 received within a through hole 32 provided on the outer tube 30. The controlling means 50 is composed of a circular cap 51 having a circumferential ridge 511 (as shown in FIG. 3) formed on an outer periphery thereof, a coil spring 52 having a diameter receivable within a recess (not numbered) of the circular cap 51, a third rivet 53 and a receiving collar 54. The receiving collar 54 is substantially cylindrical with an open first end 541, a closed first end 542 (as shown in FIG. 2) and a circumferential wall extending integrally therebetween. The circumferential wall defines two opposed cutouts 543 each sized and configured to receive the middle tube 20. The closed first end 542 defines a small bore (not shown) through which the third rivet 53 may be secured by peening of a first end of the third rivet 53. A second end of the third rivet 53 is sized to be received in a corresponding one of the holes 42. After the controlling means 50 is inserted into the through hole 32 of the outer tube 30, the inner tube 40 is then able to be inserted into the middle tube 20 through the outer tube 30.

Referring to FIG. 3, an enlargement of the schematic view of the controlling means assembled within the first open end 541 is shown. The receiving collar 54 is inserted into the through hole 32 of the outer tube 30 and the third rivet 53 then securely connects the inner tube 40 to the middle tube 20 through one of the holes 42 of the inner tube 40 and a hole (not numbered) provided on the periphery of the middle tube 20. After the inner tube 40 is securely connected with the middle tube 20 through the third rivet 53, a second pin 21 is inserted into the middle tube 20 and movably received within the slot 41 of the inner tube 40 and the coil spring 52 is disposed adjacent to the second pin 21 and received within the cap 51.

Figure 5:
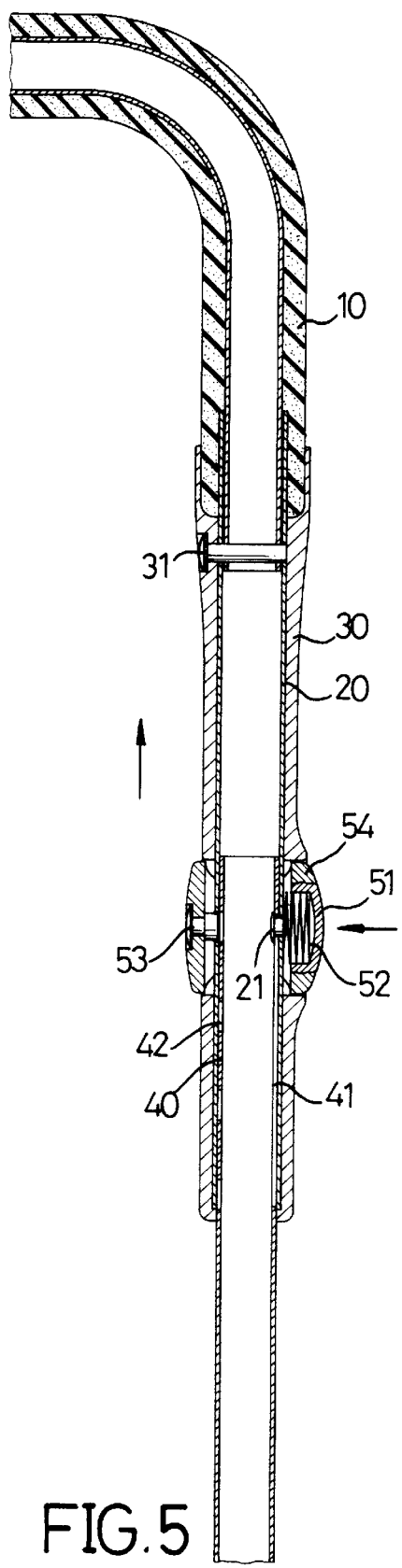
FIG. 5 is a sectional view of the invention showing that the length of the handle is being increased.
Figure 4:
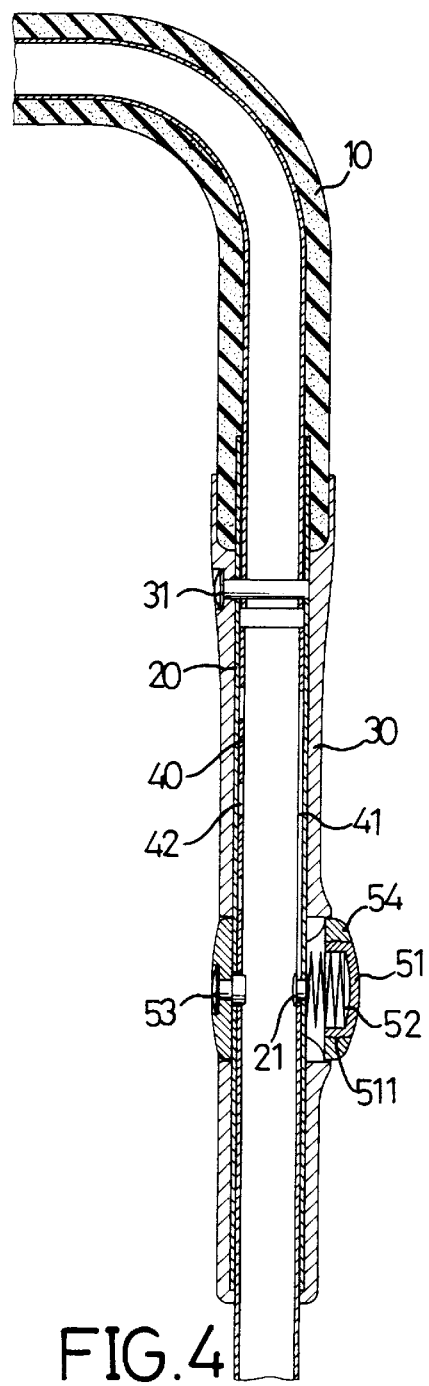
FIG. 4 is a sectional view of the invention showing that the length of the handle is fixed.
Figure 6:
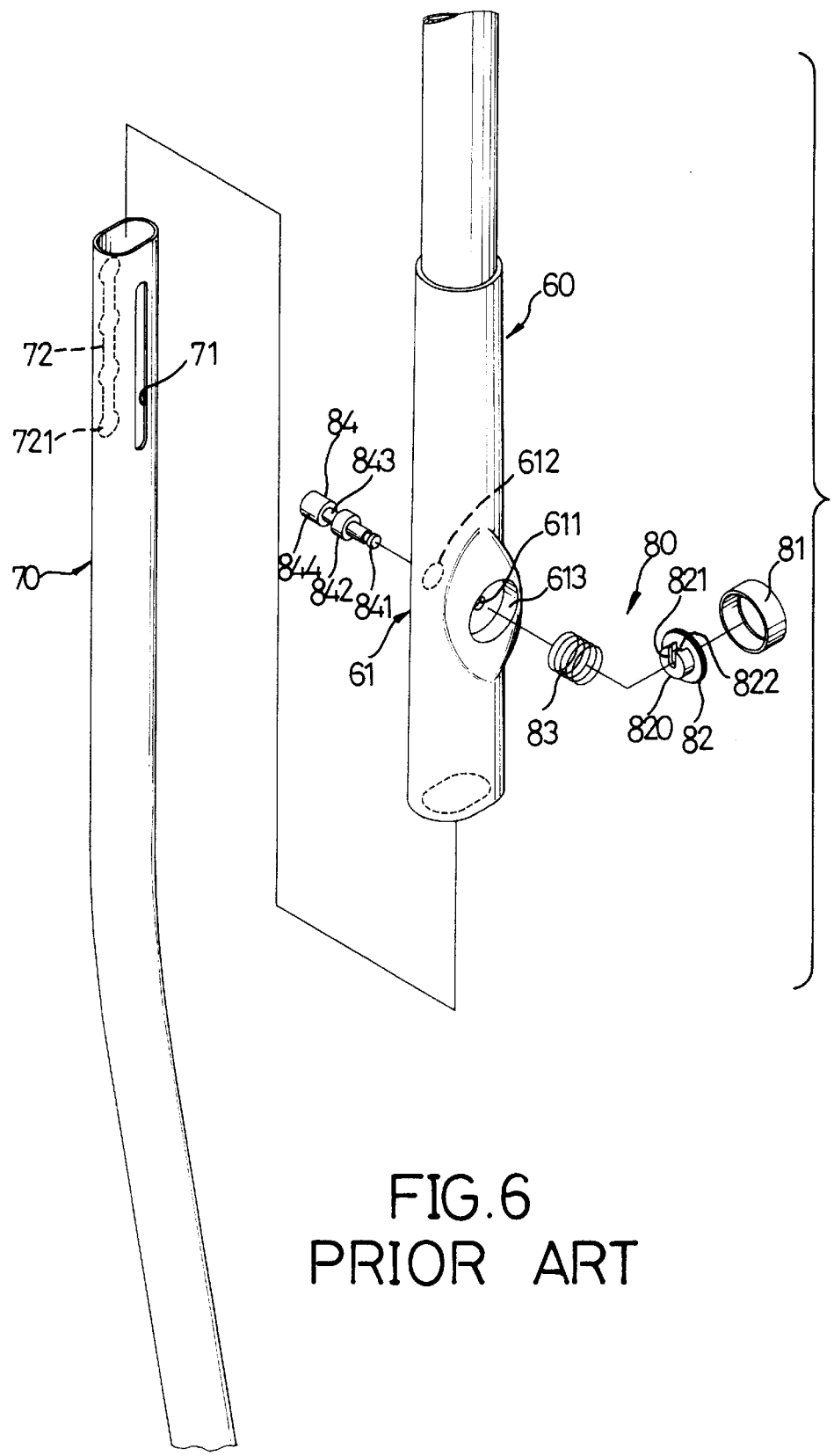
FIG. 6 is an exploded view of a prior telescopic handle.
Figures 7A, 7B:
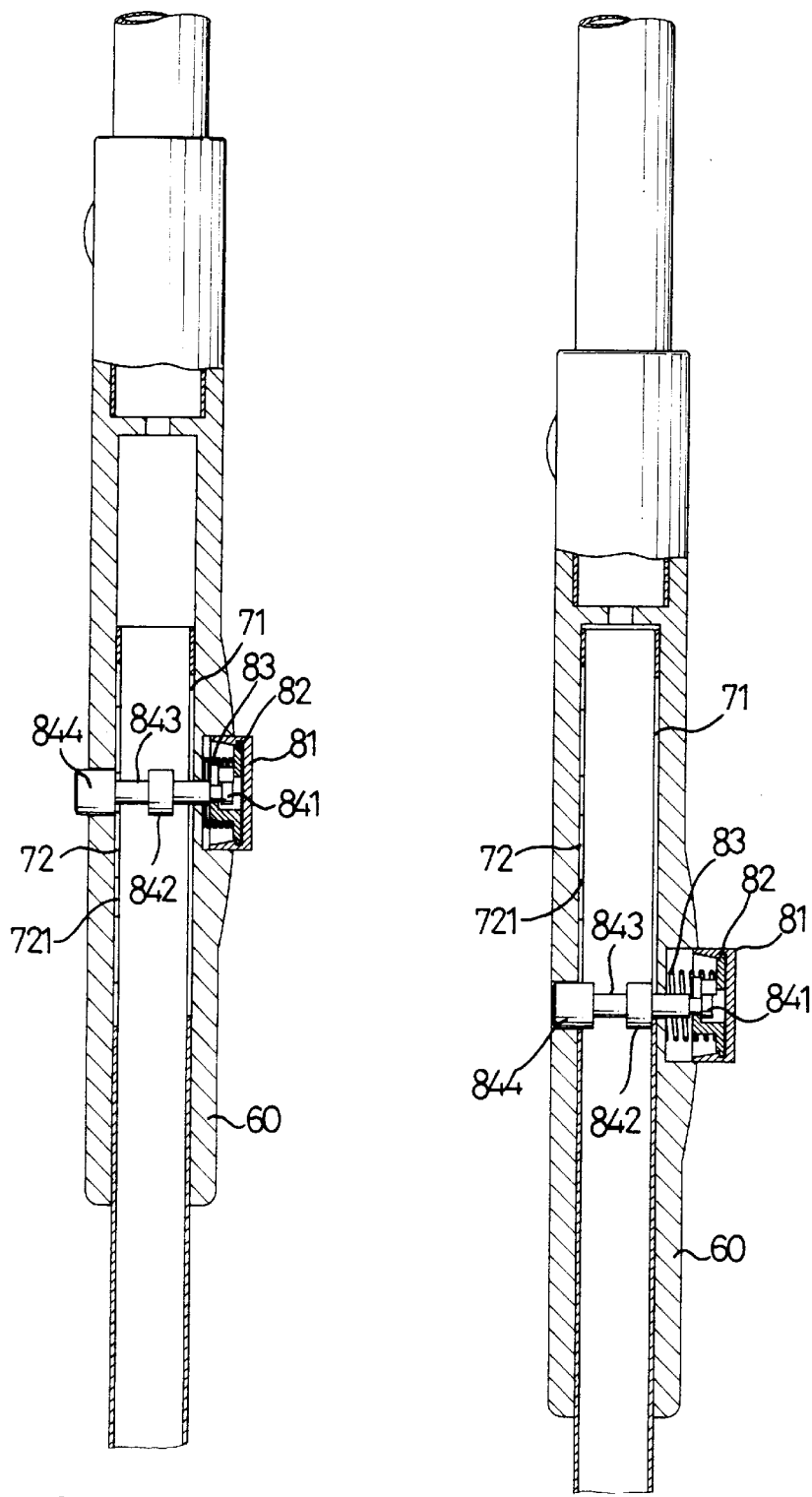
FIG. 7A is a cross sectional view of the telescopic handle as shown in FIG. 6.
FIG. 7B is a schematic cross sectional view of the telescopic handle showing that the handle is being shortened.

Referring to FIGS. 4 and 5, the telescopic handle 10 having the controlling means 50 received therein is shown. It is noted that after the handle 10, the inner tube 40, the middle tube 20 and the outer tube 30 are assembled together and the controlling means 50 is securely received within the open first end 541 of the receiving collar 54, the handle 10 is ready to be used. If a user wishes to extend the length of the handle 10, he/she may just simply press inward the cap 51 of the controlling means 50, thus the third rivet 53 will be forced to move out from one of the holes 42, then the inner tube 40 is no longer limited by the third rivet 53 and is ready to be moved. When a desired length of the handle is reached, the user may release the cap 51, and the coil spring 52 received within the cap 51 will provide a resilient force to the third rivet 53 and pull it back to one specific hole 42. Therefore, the extension of the handle 10 is accomplished.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A telescopic handle for a stroller comprising:

a handle;

a pair of middle tubes rigidly fixed within said handle;

a pair of outer tubes each securely connected with said handle through a first pin and enclosing each of said middle tube therein, said outer tube having a hole extending therethrough and comprising a controlling means received within said hole; and a pair of inner tubes having a slot and a plurality of holes provided on a periphery thereof, said inner tube movably received within each of said middle tube through a second pin movably received within said slot and a third rivet inserted into said holes of said inner tube, said middle tube and said controlling means, whereby said third rivet is movably received within said hole of said inner tube.

2. The telescopic handle for a stroller as claimed in claim 1, wherein said controlling means comprises a cap;

a spring received within said cap;

said third rivet movably received within said hole of said inner tube; and a receiving collar having an open first end for securely receiving said cap, a closed first end having a small bore provided thereon for allowing said third rivet to go through and a circumferential wall extending integrally therebetween, wherein, said circumferential wall defines two opposed cutouts each being sized and configured to receive said middle tube.

* * * * *